United States Patent
Lee (10) Patent No.: US 9,636,754 B2
(45) Date of Patent: May 2, 2017

(54) REAMER

(71) Applicant: MEENG GANE ENTERPRISE CO., LTD., Taichung (TW)

(72) Inventor: Yu-Jyun Lee, Taichung (TW)

(73) Assignee: MEENG GANE ENTERPRISE CO., LTD., Taichung (TW)

( * ) Notice: Subject to any disclaimer, the term of this patent is extended or adjusted under 35 U.S.C. 154(b) by 92 days.

(21) Appl. No.: 14/539,211

(22) Filed: Nov. 12, 2014

(65) Prior Publication Data
US 2015/0298218 A1  Oct. 22, 2015

(30) Foreign Application Priority Data
Apr. 18, 2014  (TW) .............................. 103206748 U (51) Int. Cl.
*B23B 51/00* (2006.01)
*B23D 77/12* (2006.01)
*B23B 51/10* (2006.01)

(52) U.S. Cl.
CPC ........ *B23B 51/0018* (2013.01); *B23B 51/107* (2013.01); *B23D 77/12* (2013.01); *B23B 2251/02* (2013.01); *B23B 2260/0482* (2013.01); *B23D 2277/02* (2013.01); *Y10T 279/17846* (2015.01); *Y10T 279/17957* (2015.01); *Y10T 408/8925* (2015.01); *Y10T 408/906* (2015.01); *Y10T 408/9098* (2015.01)

(58) Field of Classification Search
CPC ... B23B 51/0018; B23B 51/107; B23B 51/10; B23B 2251/02; B23B 2260/0482; B23D 77/12; B23D 2277/02; Y10T 408/8925; Y10T 408/906; Y10T 408/9065; Y10T 408/907; Y10T 408/9098; Y10T 279/17846; Y10T 279/17863; Y10T 279/17957

See application file for complete search history.

(56) References Cited

U.S. PATENT DOCUMENTS

| | | | | |
|---|---|---|---|---|
| 129,414 | A * | 7/1872 | Leet ........................ | B25B 15/02 223/104 |
| 1,839,835 | A * | 1/1932 | Cook .................. | B25B 23/0042 279/102 |
| 2,641,478 | A * | 6/1953 | Sigg ........................ | B25B 15/02 279/102 |
| 2,655,964 | A * | 10/1953 | Labbee, Jr. ........... | B23B 49/005 408/224 |
| 4,123,193 | A * | 10/1978 | Hill ........................ | B23B 49/005 408/202 |
| 4,480,951 | A * | 11/1984 | Regensburger ..... | F16B 25/0031 408/213 |
| 5,271,697 | A * | 12/1993 | Johnson .............. | B23B 31/1071 279/75 |
| 6,120,225 | A * | 9/2000 | Palm ..................... | F16B 19/083 408/225 |

(Continued)

*Primary Examiner* — Eric A Gates (57) ABSTRACT

A reamer includes a shank, a washer, a ring and a blade. The shank is a polygonal rod and includes an annular groove made in a periphery and a bore made in an end. The washer includes a slot. The ring includes a circular opening. The blade includes an insert inserted in the bore through the slot and the circular opening. The circular opening is made of a diameter larger than a width of the blade to allow the blade to rotate relative to the ring.

4 Claims, 7 Drawing Sheets

(56) References Cited

U.S. PATENT DOCUMENTS

| | | | | |
|---|---|---|---|---|
| 6,644,898 B2* | 11/2003 | Chu | ............ | B23B 3/24 |
| | | | | 408/115 B |
| 7,258,513 B2* | 8/2007 | Gertner | ............ | B23B 49/005 |
| | | | | 408/202 |
| 7,264,427 B1* | 9/2007 | Kunz-Mujica | ............ | B23B 49/005 |
| | | | | 408/202 |
| 7,665,989 B2* | 2/2010 | Brajnovic | ............ | A61C 8/0089 |
| | | | | 433/165 |
| 8,052,359 B2* | 11/2011 | Wirth, Jr. | ............ | B23B 49/005 |
| | | | | 408/191 |
| 8,714,887 B2* | 5/2014 | Tipps | ............ | B23B 51/10 |
| | | | | 408/1 R |

\* cited by examiner

REAMER

BACKGROUND OF INVENTION

1. Field of Invention

The present invention relates to a reamer and, more particularly, to a reamer that does not cause any damage to the surface of a work-piece.

2. Related Prior Art

In carpentry, pieces of wood can be connected to each other by screws or threaded bolts. Wood includes fibers. A drill can be used to make a hole of an intended diameter in a piece of wood. However, the hole could later be enlarged or damaged and hence fail to hold a screw or threaded bolt because fibers are pulled off the wood. Hence, generally, a drill is used to make a hole of a diameter smaller than an intended diameter in the piece of wood. Then, a reamer is used to enlarge the hole so that the hole is made of the intended diameter.

Therefore, the present invention is intended to obviate or at least alleviate the problems encountered in prior art.

SUMMARY OF INVENTION

It is the primary objective of the present invention to provide a reamer that does not cause any damage to the surface of a work-piece.

To achieve the foregoing objective, the reamer includes a shank, a washer, a ring and a blade. The shank is a polygonal rod and includes an annular groove made in a periphery and a bore made in an end. The washer includes a slot. The ring includes a circular opening. The blade includes an insert inserted in the bore through the slot and the circular opening. The circular opening is made of a diameter larger than a width of the blade to allow the blade to rotate relative to the ring.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Referring to FIGS. 1 through 5, a reamer includes a shank 10 and a blade 20 according to a first embodiment of the present invention. The blade 20 is connected to an end of the shank 10. In use, another end of the shank 10 is inserted in a socket of an electric tool. The blade 20 is used to turn a raw hole in a work-piece into a finished hole. The blade 20 can be made of various sizes.

The shank 10 is a polygonal rod. The shank 10 is a hexagonal rod in the first embodiment. The shank 10 includes, in the periphery, an annular groove 11 to receive a spring-loaded detent attached to the socket when the shank 10 is inserted in the socket. Thus, the shank 10 is retained in position. The shank 10 includes, in a lower end, a bore 15 for receiving the blade 20. A washer 16 can be attached to the lower end of the shank 10. The washer 16 includes a slot 18 corresponding to the bore 15. The distance of an upper face of the washer 16 from the annular groove 11 is determined according to the position of the spring-loaded detent in the socket. The washer 16 is used to limit the depth of the shank 10 inserted in the socket.

The blade 20 is a flat element. The blade 20 includes a pointed portion 21 at a leading end so that the blade 20 can precisely be inserted in the raw hole. The blade 20 includes another tapered portion 22 near a tailing end. The tapered portion 22 is used to make a chamfer at an upper end of the raw hole. The blade 20 includes an insert 25 at the tailing end. The insert 25 of the blade 20 is inserted in the bore 15 of the shank 10 through the slot 18 of the washer 16.

Figure 1:
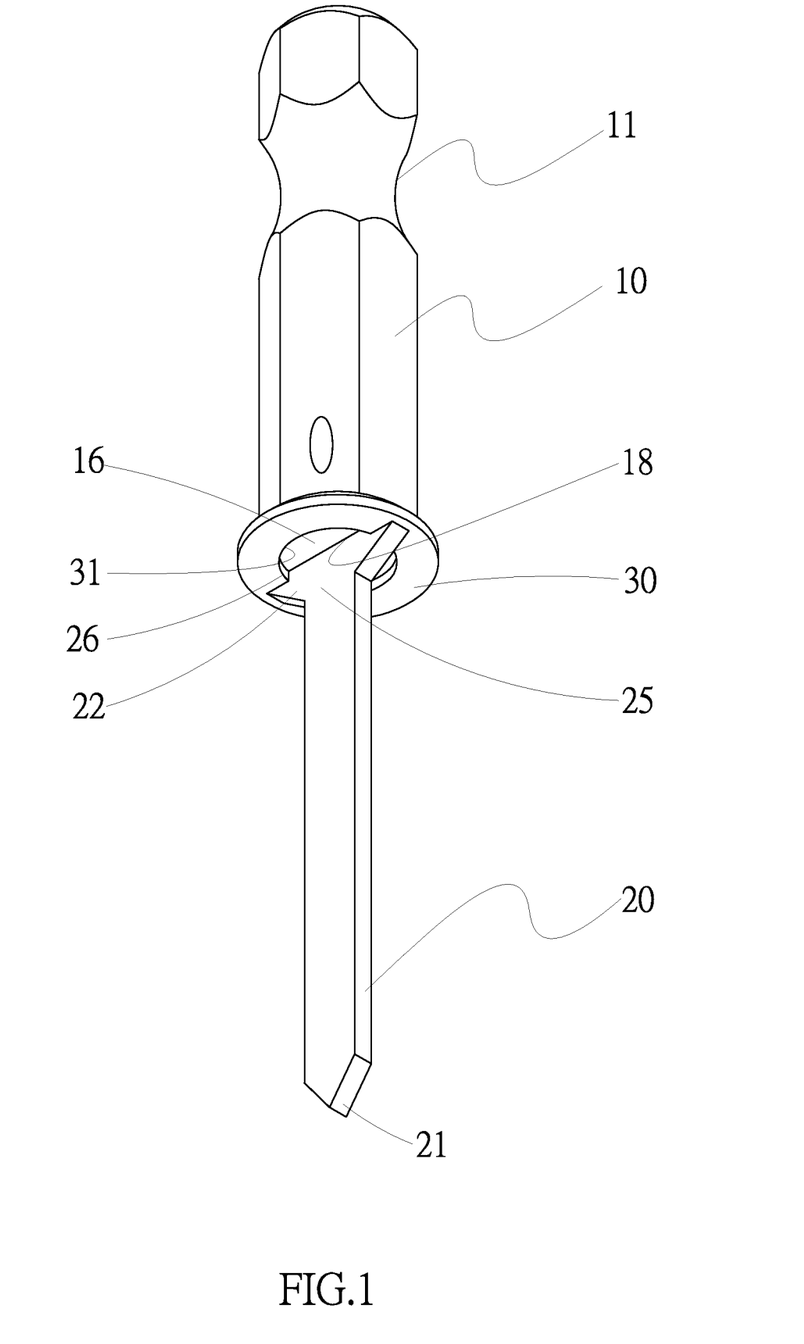
FIG. 1 is a perspective view of a reamer according to the first embodiment of the present invention.
Figure 2:
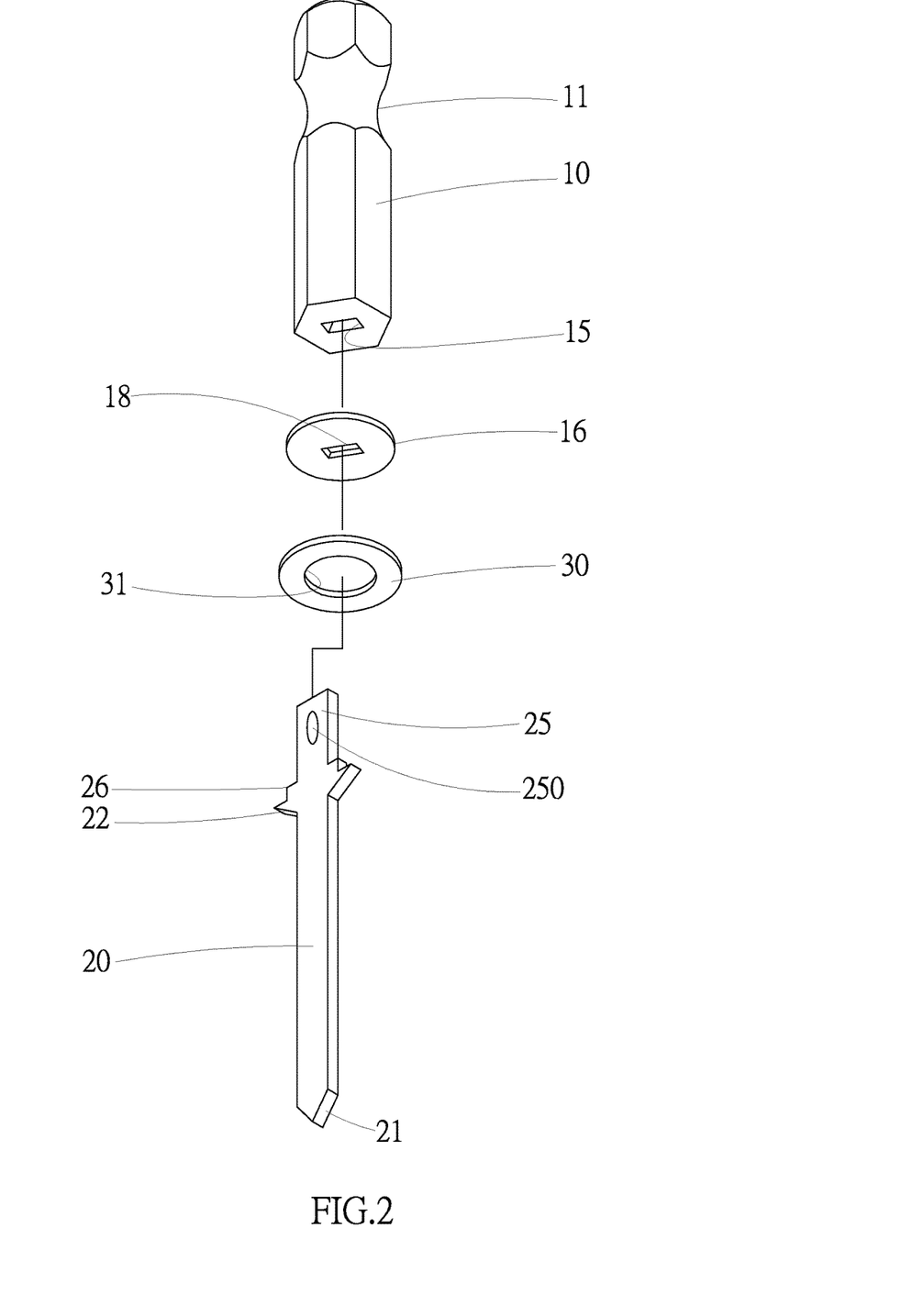
FIG. 2 is an exploded view of the reamer shown in FIG. 1.
Figure 3:
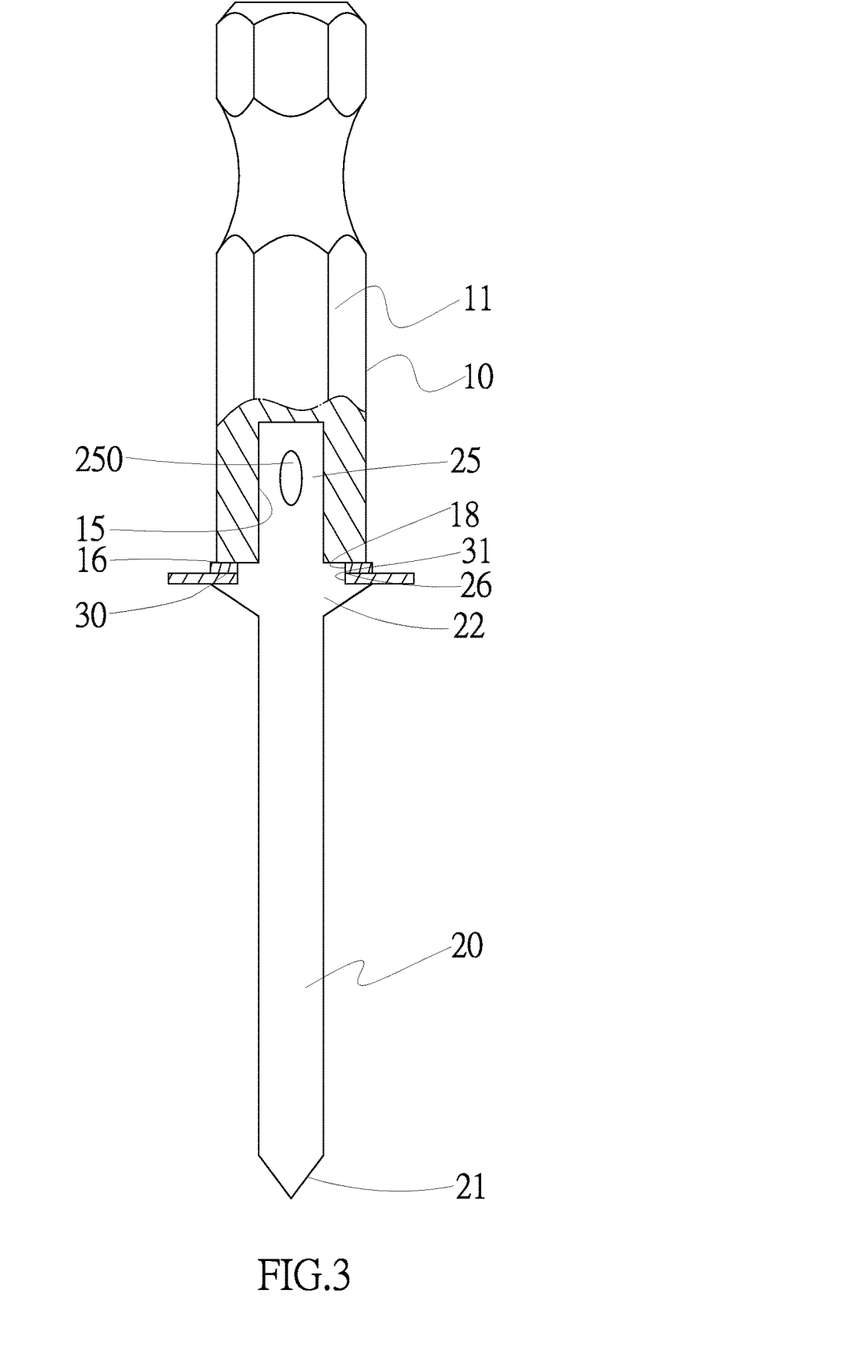
FIG. 3 is a cut-away view of the reamer shown in FIG. 1.
Figure 4:
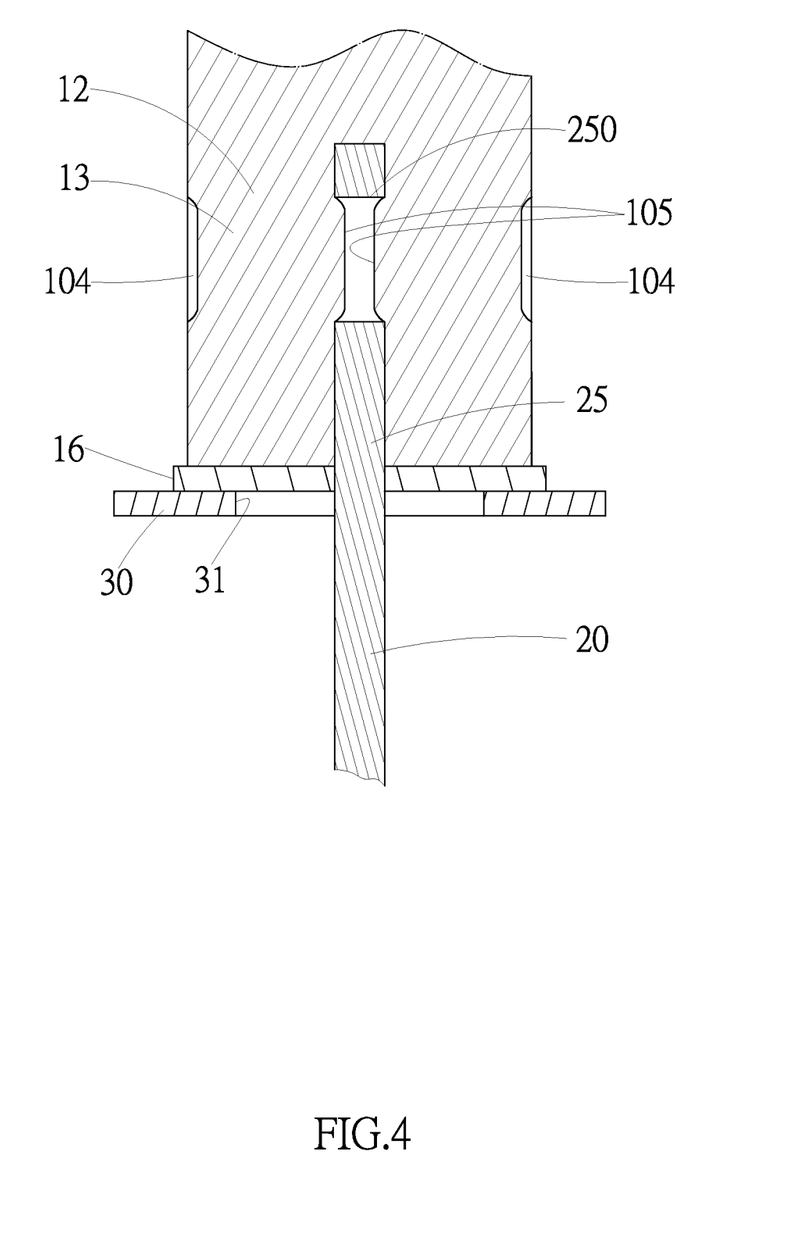
FIG. 4 is a partial, cross-sectional view of the reamer illustrated in FIG. 1.
Figure 5:
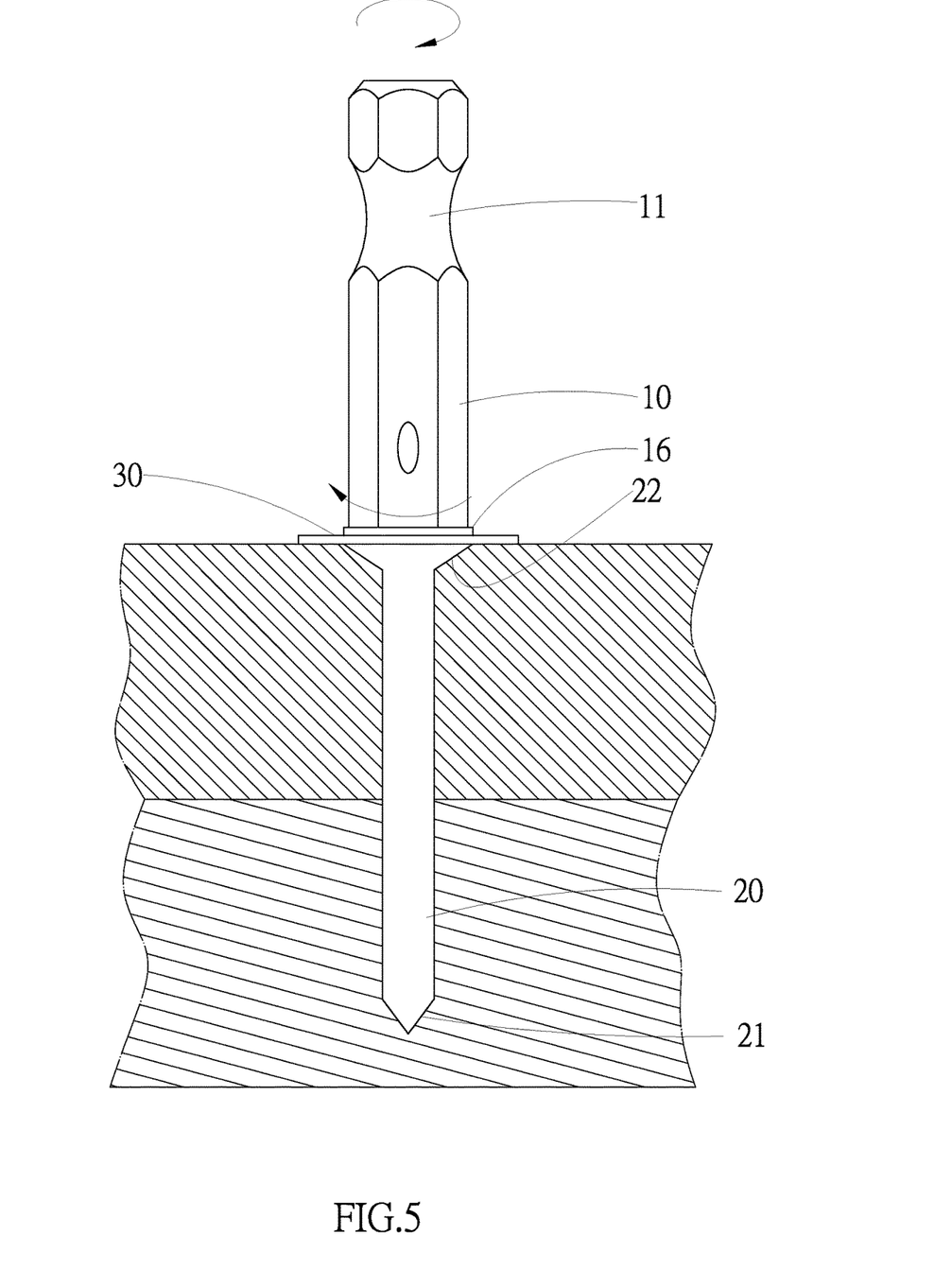
FIG. 5 is a cross-sectional view of two pieces of wood reamed by the reamer shown in FIG. 1.

Referring to FIG. 4, the insert 25 is made with an aperture 250 that is preferably an oval aperture. The periphery of the shank 10 is punched when the insert 25 of the blade 20 is inserted in the bore 15. Thus, the periphery of the shank 10 is made with two recesses 104. Accordingly, an internal face of the shank 10 is made with two bosses 105 that are inserted in the aperture 250. Therefore, the blade 20 is secured to the shank 10.

The blade 20 further includes an enlarged portion 26 for insertion in the slot 18 of the washer and an opening 31 made in a ring 30. The opening 31 is a circular one of a diameter larger than the width of the enlarged portion 26 of the blade 20. The fact that the width of the enlarged portion 26 of the blade 20 is smaller than the diameter of the opening 31 allows the shank 10 and the blade 20 to rotate relative to the ring 30 that is pressed on a surface of the work-piece. Thus, the surface of the work-piece is protected from the washer 16, which might otherwise damage the surface of the work-piece.

The shank 10 is inserted in the electric tool. The blade 20 is used to enlarge and turn the raw hole into the finished hole. Furthermore, the blade 20 is used to make the finished hole a countersink hole.

Referring to FIGS. 1 through 5, the shank 10, a polygonal rod, is inserted in the socket of the electric tool in use. The washer 16 is used to ensure that the shank 10 be properly inserted in the socket, not too shallow or deep. The annular groove 11 of the shank 10 is used to receive the spring-loaded detent of the socket so that the reamer is kept on the electric tool, without having to provide the electric tool with a chuck to hold a conventional reamer. Hence, the reamer of the present invention can conveniently, quickly be operated with a single hand.

Moreover, the ring 30 is pressed on the surface of the work-piece when the blade 20 is inserted in the raw hole. The tapered portion 22 of the blade 20 is used to make a tapered portion of the finished hole, i.e., turning the finished hole is made a countersink hole. The ring 30 is used to ensure a proper depth of the finished hole, not too shallow or deep.

Furthermore, the blade 20 can be rotated relative to the ring 30. Thus, the washer 16 is prevented by the ring 30 from scratching the surface of the work-piece when the ring 30 is pressed on the surface of the work-piece.

Figure 6:
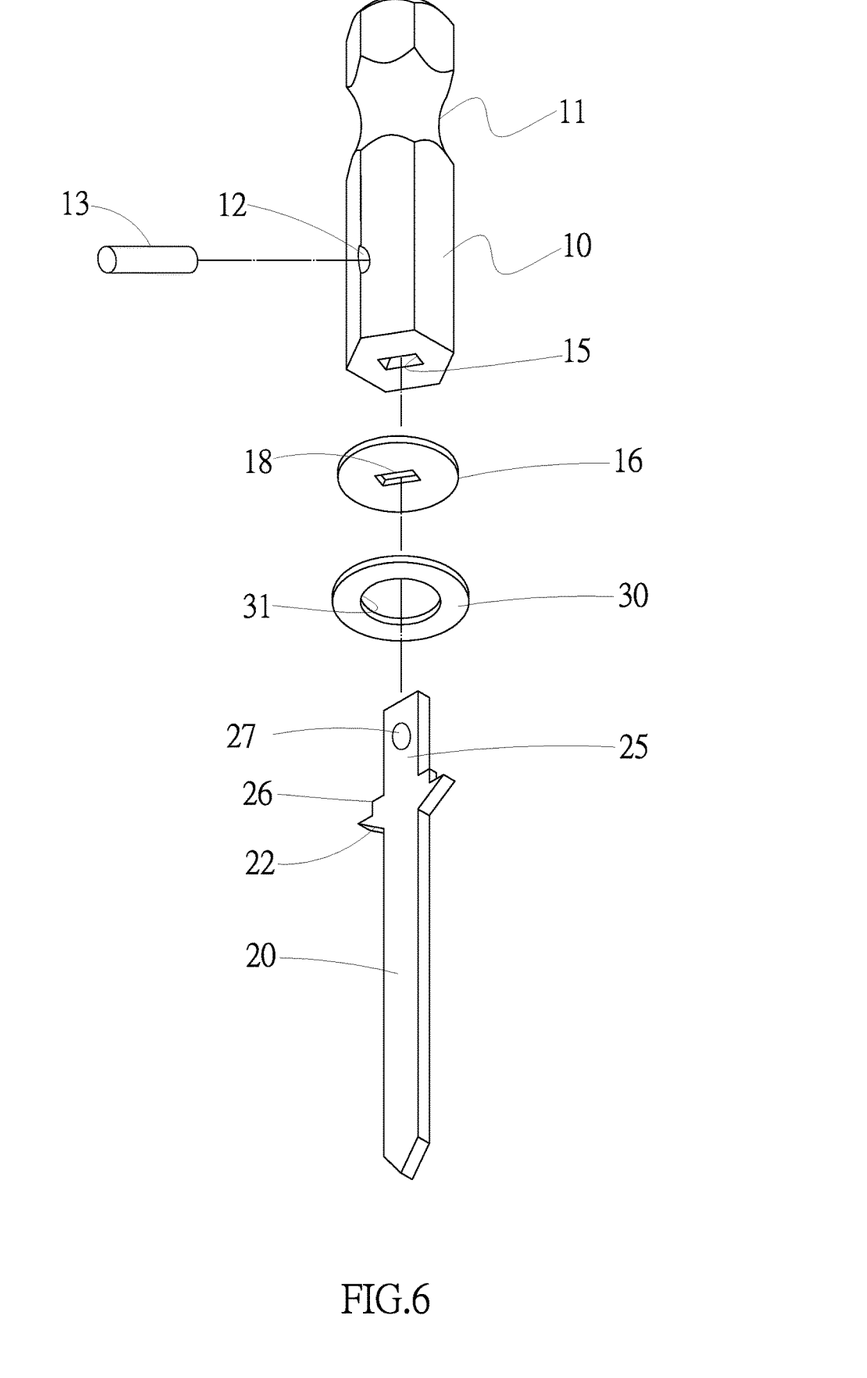
FIG. 6 is an exploded view of a reamer according to the second embodiment of the present invention.
Figure 7:
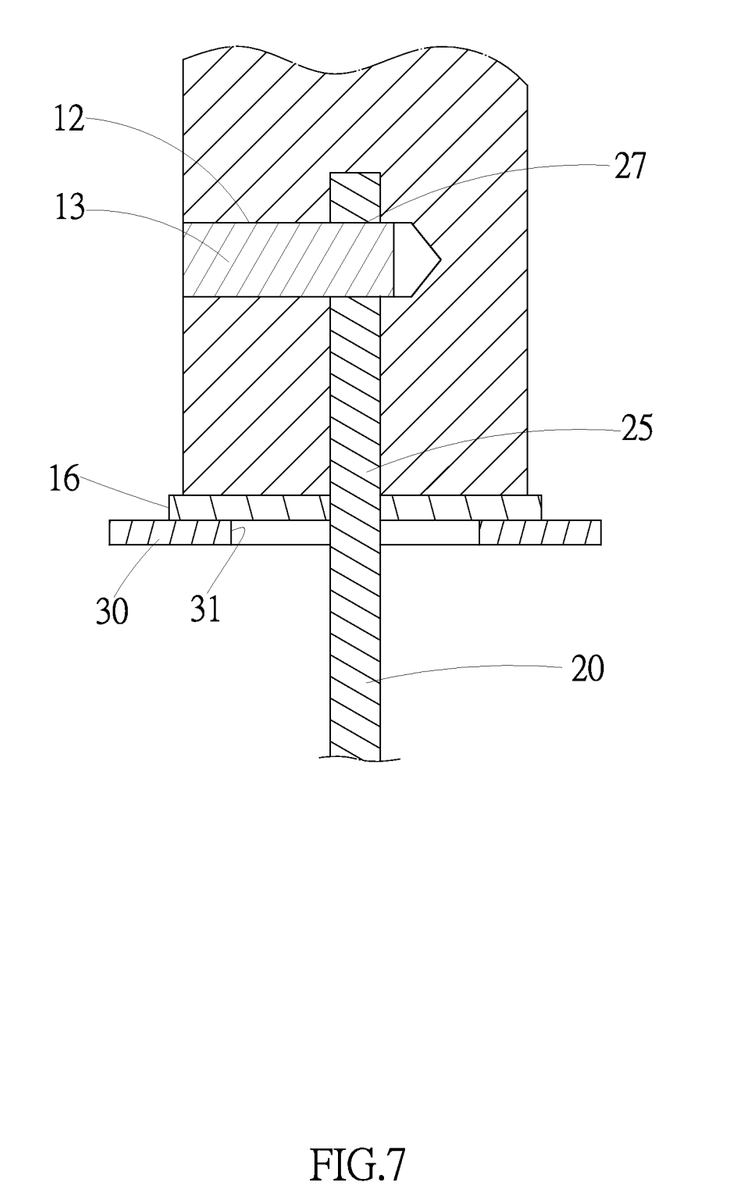
FIG. 7 is a partial, cross-sectional view of the reamer illustrated in FIG. 6.

Referring to FIGS. 6 and 7, the shank 10 includes an aperture 12 in communication with the bore 15 according to a second embodiment of the present invention. The insert 25 is made with an aperture 27 instead of the aperture 250. The aperture 27 is a circular aperture made of a diameter smaller than the short axis of the aperture 250. A pin 13 is inserted in the aperture 27 via the aperture 12. Thus, the blade 20 is secured to the shank 10. The second embodiment is otherwise identical to the first embodiment.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A reamer including:
   a shank including two bosses made on an internal side, an annular groove made in a periphery and a bore made in an end;
   a washer including a slot;
   a ring including a circular opening;
   a blade including:
   an insert inserted in the bore through the slot and the circular opening so that the blade is not rotatable relative to the washer and the shank, wherein the insert comprises an aperture for receiving the bosses to keep the insert in the shank;
   an enlarged portion formed next to the insert and inserted in the slot and the circular opening, wherein the circular opening is made of a diameter larger than width of the enlarged portion of the blade to allow the blade to rotate relative to the ring; and
   a tapered portion formed next to the enlarged portion and adapted for making a tapered portion of a countersink hole, wherein the shank and the washer are kept from a work-piece by the ring that is in non-rotational contact with the work-piece when the tapered portion of the blade cuts into the work-piece, wherein the diameter of the circular opening is smaller than width of the tapered portion of the blade.

2. The reamer according to claim 1, wherein the shank is a hexagonal rod.

3. The reamer according to claim 1, wherein the blade includes a pointed portion at an end opposite to the insert.

4. The reamer according to claim 1, wherein the bosses are made by punching an external side of the shank.

* * * * *